US010372409B2

(12) United States Patent
Luk et al.

(10) Patent No.: US 10,372,409 B2
(45) Date of Patent: Aug. 6, 2019

(54) AUDIO CONTROL SYSTEM

(71) Applicant: EBAY INC., San Jose, CA (US)

(72) Inventors: Bryant G. Luk, San Jose, CA (US); Christopher D. O'Toole, Austin, TX (US); Robert He, Austin, TX (US); Yu Tang, San Jose, CA (US); Jennifer T. Brenner, San Jose, CA (US); Leith Shabbot, Austin, TX (US); Ananya Das, San Jose, CA (US); Jason Ziaja, San Jose, CA (US)

(73) Assignee: Ebay Inc., San Jose, CA (US)

( * ) Notice: Subject to any disclaimer, the term of this patent is extended or adjusted under 35 U.S.C. 154(b) by 292 days.

(21) Appl. No.: 14/586,047

(22) Filed: Dec. 30, 2014

(65) Prior Publication Data

US 2016/0188285 A1 Jun. 30, 2016

(51) Int. Cl.
*G06F 17/00* (2019.01)
*G06F 3/16* (2006.01)

(52) U.S. Cl.
CPC .................................... *G06F 3/165* (2013.01)

(58) Field of Classification Search
CPC .................................. G06F 3/165; H04R 5/04
See application file for complete search history.

(56) References Cited

U.S. PATENT DOCUMENTS

| | | | | |
|---|---|---|---|---|
| 2009/0179752 A1* | 7/2009 | Patel | H04M 1/72572 | 340/539.13 |
| 2010/0105331 A1* | 4/2010 | Buehler | H04B 5/02 | 455/41.3 |
| 2012/0121103 A1* | 5/2012 | Cohen | H04R 1/1083 | 381/77 |
| 2015/0358718 A1* | 12/2015 | Kaller | H04R 1/1041 | 381/56 |

* cited by examiner

*Primary Examiner* — Md S Elahee
*Assistant Examiner* — David Siegel

(57) ABSTRACT

Systems and methods for controlling an audio device include a system provider device that retrieves, through a network, audio device information for at least one audio device. The system provider device also receives an indication of a triggered alert from at least one of a plurality of devices. In various embodiments, the system provider device determines an alert type corresponding to the received indication of the triggered alert. In addition, the system provider device modifies an audio setting of the at least one audio device based on the determined alert type. In some examples, the system provider device further modifies the audio setting of the at least one audio device to return the modified audio setting of the at least one audio device to a pre-modified setting.

20 Claims, 14 Drawing Sheets

AUDIO CONTROL SYSTEM

BACKGROUND

Field of the Invention

The present disclosure generally relates to an audio control system, and more particularly to an audio control system that interfaces with an audio device to control a one or more settings of the audio device in response to at least one of a plurality of external stimuli.

Related Art

In times of emergency, it is critical to command the attention of people who need to be notified of the emergency. For example, emergency vehicles (e.g., police, ambulance, fire/rescue) may use sirens to notify others of their approach. However, some drivers may be traveling with their car stereo system at a very high volume, or they may be driving while wearing headphones (e.g., to listen to music or while on their mobile phone) or while wearing a Bluetooth® headset (i.e., a hands-free headset). Thus, such drivers may not be able to adequately hear the approaching siren and may not respond until a later time if/when they notice emergency vehicle lights. Similarly, there may be other situations in which it is necessary to get an individual's attention, but where the individual is unable to readily hear. For instance, in some cases, individuals who work in high-noise environments (e.g., manufacturing sector jobs) often use ear protection such as noise cancelling headphones to protect themselves from occupationally-induced hearing loss. However, there may be situations, such as a fire, a tornado, or other building emergency where an emergency message needs to be quickly delivered to employees working in the affected area and/or building. By way of example, visual indicators may be used (e.g., flashing lights) but would only be useful for those individuals within view of such visual indicators. Alternatively, one or more individuals may be tasked with personally finding and notifying one or more co-workers to deliver the message. In other examples, office workers may enjoy working with headphones on while listening to music, podcasts, etc. As in the above examples, such workers may not readily hear alarms or see visual indicators, and so such workers may also rely on co-workers to personally find them to deliver an urgent message.

Thus, there is a need for an audio control system that provides a way to control an audio device (e.g., including a stereo, headphones, etc.) in response to at least one of a plurality of external stimuli, and which can be used as a rapid and reliable way to remove unwanted audio impairments, particularly during emergency situations.

Figure 1:
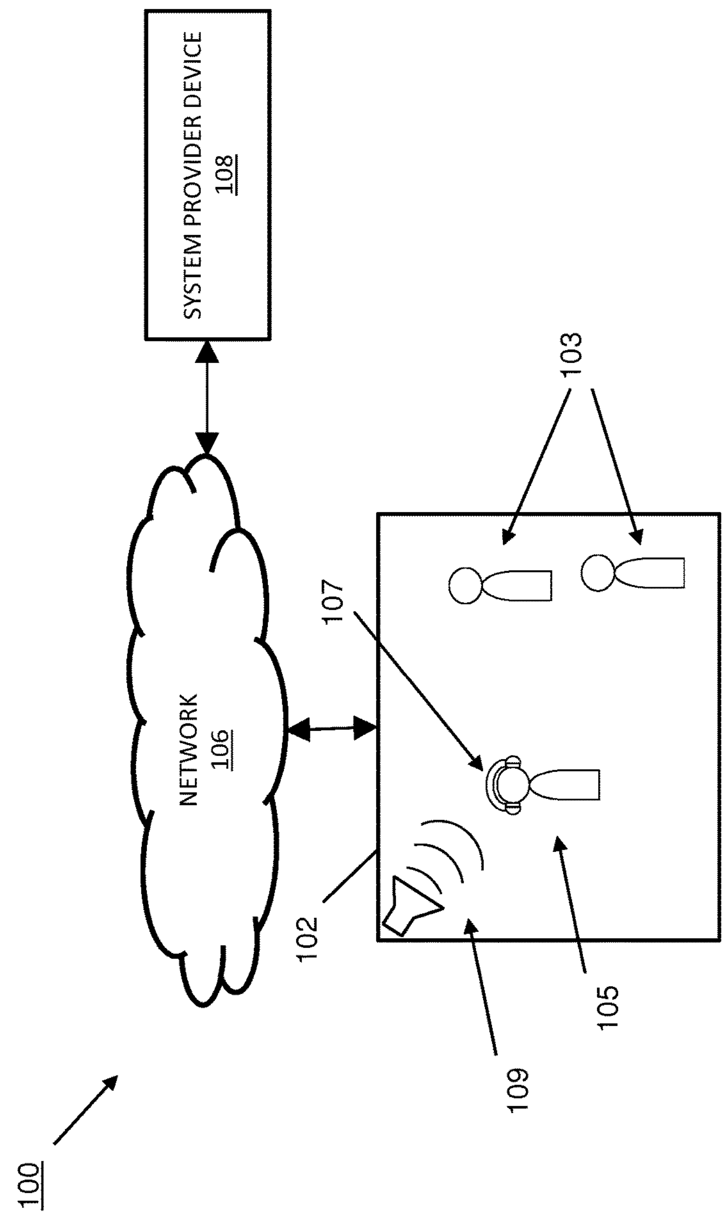
FIG. 1 is a schematic view illustrating an embodiment of an audio control system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for controlling an audio device (e.g., including a stereo, headphones, etc.) in response any one of a plurality of external stimuli. The systems and methods described herein may be used as a quick and reliable way to remove hearing impairments, for example such as headphones, car stereos, home theater systems, or other such audio devices as known in the art, particularly during emergency situations.

As discussed above, conventional methods of alerting and/or notifying individuals during an emergency may not always be effective, for example such as when an individual has their hearing obstructed by another audio source or by noise cancelling headphones. In some illustrations, emergency vehicles (e.g., police, ambulance, fire/rescue) may use sirens to notify individuals of their approach. However, drivers and/or passengers traveling in a car while listening to music very loudly may not hear the approaching sirens. Alternatively, drivers and/or passengers wearing headphones or a Bluetooth® headset (e.g., to listen to music or while on their mobile phone) may similarly not hear emergency vehicles approaching. In some embodiments of the present disclosure, approaching emergency vehicles may be configured to wirelessly communicate with a car stereo, a Bluetooth® headset, a headphone set, or a user's mobile device, among others, to remotely lower the volume (or mute) of such devices in order to remove hearing obstructions and thereby allow individuals to hear their approach and respond appropriately (e.g., by moving to the side of the roadway). In other illustrations, individuals who work in high-noise environments (e.g., manufacturing sector jobs) may use ear protection, such as noise cancelling headphones, which can limit their ability to readily hear alarms, instructions of others, etc. Similarly, office workers may enjoy working while wearing headphones (in some cases, noise cancelling headphones) in order to listen to music, podcasts, etc. By way of example, visual indicators may be used (e.g., flashing lights) to alert workers, but any individual who does not see such visual indicators could remain unaware of events around them. Rather than inefficiently tasking individuals with personally finding and relaying messages to co-workers, some embodiments disclosed herein provide for wireless communication between a local and/or remote system provider device and one or more audio devices. For example, a local and/or remote system provider device may communication with noise cancelling headphones, workplace radios, Bluetooth® headsets, headphone sets, user mobile devices, or other audio devices, for example, to disable a noise cancelling feature and/or lower the volume (or mute) of any such audio devices in order to remove hearing obstructions. In this manner, workers will be able to readily hear a broadcast emergency message, instructions from a co-worker, or other emergency signal so that they can take appropriate action.

Referring now to FIG. 1, an embodiment of an audio control system 100 is illustrated. The audio control system 100 includes a business 102 having a business physical location. While the embodiments herein are shown and described with reference to a single business for the sake of clarity, it will be understood that various embodiments may include a plurality of businesses at a plurality of physical locations, and/or a single business having a plurality of business physical locations. In various examples, the business 102 includes one or more local devices that are coupled to a network 106 that is further coupled to a system provider device 108. For example, the business 102 and the system provider device 108 are configured to communicate with one another by way of the network 106, for example by way of network communication devices, as discussed below. In the embodiments illustrated and discussed below, the business 102 may be a warehouse, a manufacturing facility, an office building or portion thereof, a theme park, a grocery store, a department store, a restaurant, a movie theater, a sports stadium, and/or a variety of other businesses as known in the art. However, one of skill in the art in possession of the present disclosure will recognize that the audio control system 100 described herein may be utilized by virtually any business at any physical location. Moreover, one of skill in the art in possession of the present disclosure will recognize that the audio control system 100 is not limited to businesses, and the audio control system 100 described herein may also be utilized at a place of residence (e.g., a home, an apartment, a dorm, a condo, etc.), in private and public modes of transportation (e.g., cars, trains, planes, subways, buses, etc.), and/or at any place where audio devices may obstruct an individual's ability to hear, especially during emergency situations.

The network 106 may be implemented as a single network or a combination of multiple networks. For example, in various embodiments, the network 106 may include the Internet and/or one or more intranets, landline networks, wireless networks, cellular networks, satellite networks, and/or other appropriate types of networks. In some examples, the business 102 may communicate through the network 106 via cellular communication, by way of one or more local network communication devices. In other examples, the business 102 may communicate through the network 106 via wireless communication (e.g., via a WiFi network), by way of one or more local network communication devices. In yet other examples, the business 102 may communicate through the network 106 via any of a plurality of other radio and/or telecommunications protocols, by way of one or more local network communication devices. In still other embodiments, the business 102 may communication through the network 106 using a Short Message Service (SMS)-based text message, by way of one or more network communication devices.

The system provider device 108 may likewise couple to the network 106 via a wired or wireless connection. As described in more detail below with reference to FIG. 14, the system provider device 108 may include an audio control engine, a communication engine, a business physical location database, and a user database. Software or instructions stored on a computer-readable medium, and executed by one or more processors of the system provider device 108, allows the system provider device 108 to send and receive information over the network 106. Furthermore, the audio control engine in the system provider device 108 may be configured to implement the various embodiments of the audio control system as described herein. In some examples, the system provider device 108 is configured to modify an audio setting of an audio device (e.g., mute, lower a volume, pause playback, etc.) based on a determined alert type, thus removing impediments to hearing (e.g., in the form of headphones, car stereos, home theater systems, etc.) so that ambient sounds such as alerts, sirens, informational messages, or other alerts/messages which may be of interest or which may be crucial time-sensitive alerts may be readily heard and understood.

In the embodiment illustrated in FIG. 1, one or more individuals 103, 105 may be at the business 102 physical location. The arrival, departure, and/or position of the one or more individuals 103, 105 may be detected by way of one or more beacon devices in a beacon system, as discussed below. In some embodiments, the system provider may provide the audio control system 100 for the business 102 at the business physical location, as well as for any other businesses, residence, or public/private modes of transportation implementing the audio control system 100. In some embodiments, the system provider provides a stimulus, or instructs the business 102 to provide a stimulus (e.g., such as one or more of a plurality of wireless communication signals) to noise cancelling headphones, radios, Bluetooth® headsets, headphone sets, user mobile devices, or other audio devices at the business 102 location, as discussed below. In the example of FIG. 1, the individual 105 is wearing headphones 107, which may include noise cancelling headphones. In some illustrations, the individual 105 may be listening to music, or the individual 105 may be working in a noisy area of the business 102 location, and may be taking advantage of a noise-cancelling function of the headphones 107. As described in more detail below, embodiments of the present disclosure provide for removal of obstructions to an individual's hearing, such as the individual 105. As merely one example, and with reference to FIG. 1, the system provider device 108 may communicate, by the network 106, with the headphones 107 to disable a noise-cancelling function so that the individual 105 is readily able to hear an alarm 109. In another example, the system provider device 108 may communicate, by the network 106, with a user device, to which the headphones

107 are connected, to lower the volume, mute, or pause, any audio source playing via the headphones 107.

Figure 2:
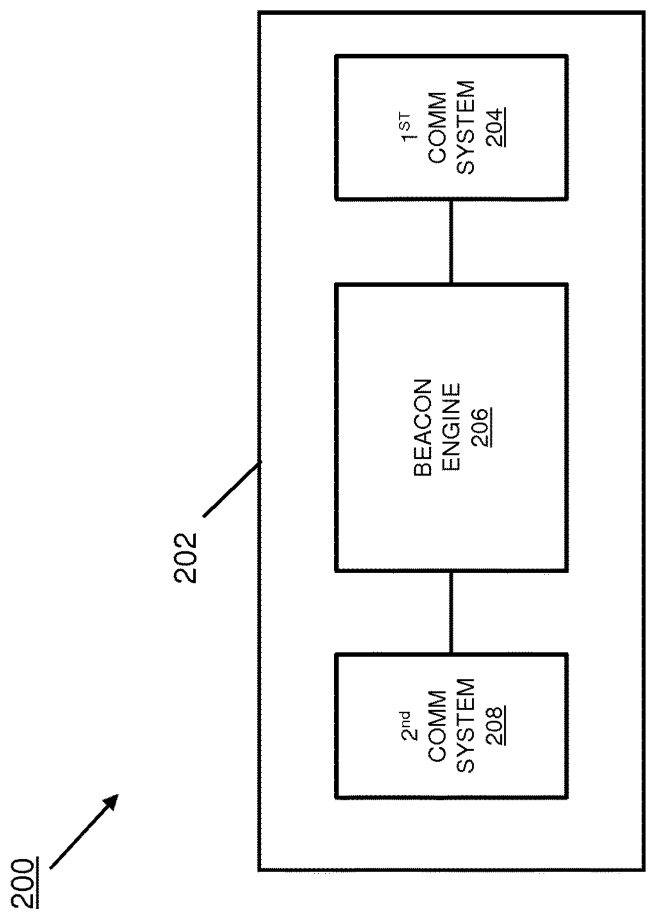
FIG. 2 is a schematic view illustrating an embodiment of a beacon device.

Referring now to FIG. 2, an embodiment of a beacon device 200 is illustrated. The beacon device 200 includes a chassis that houses a first communications system 204 such as, for example, a WiFi communications system, a cellular communication system, and/or a variety of other communication systems known in the art. The first communications system 204 is coupled to a beacon engine 206 that may be provided by instruction on a memory system (not illustrated) in the beacon device 200 that, when executed by a processing system (not illustrated) in the beacon device 200, causes the processing system to perform the functions of the beacon device 200 discussed below. The beacon engine 206 is coupled to a second communication system 208 such as, for example, a Bluetooth® Low Energy (BLE) communication system, a BLE direct communication system, a Near Field Communication (NFC) system, and/or a variety of other communication systems known in the art. The beacon engine 206 may be configured to receive any of a variety of sensor signals through the second communication system 208 and transmit those sensor signals using the first communication system 204. While a few examples of communications components in the beacon device 200 have been described, one of skill in the art will recognize that other communications devices, as well as other components that have been omitted for clarity of discussion and illustrated, may be included in the beacon device 200 and will fall within the scope of the present disclosure. One of skill in the art will recognize that the components described above allow for the beacon device to be provided in a relatively small form factor such that it may be placed inconspicuously almost anywhere. As such, the chassis 202 of the beacon device 200 may include any of a variety of features that allow for the coupling of the beacon device to any part of a business physical location, such as a business physical location associated with the business 102.

Figure 3A:
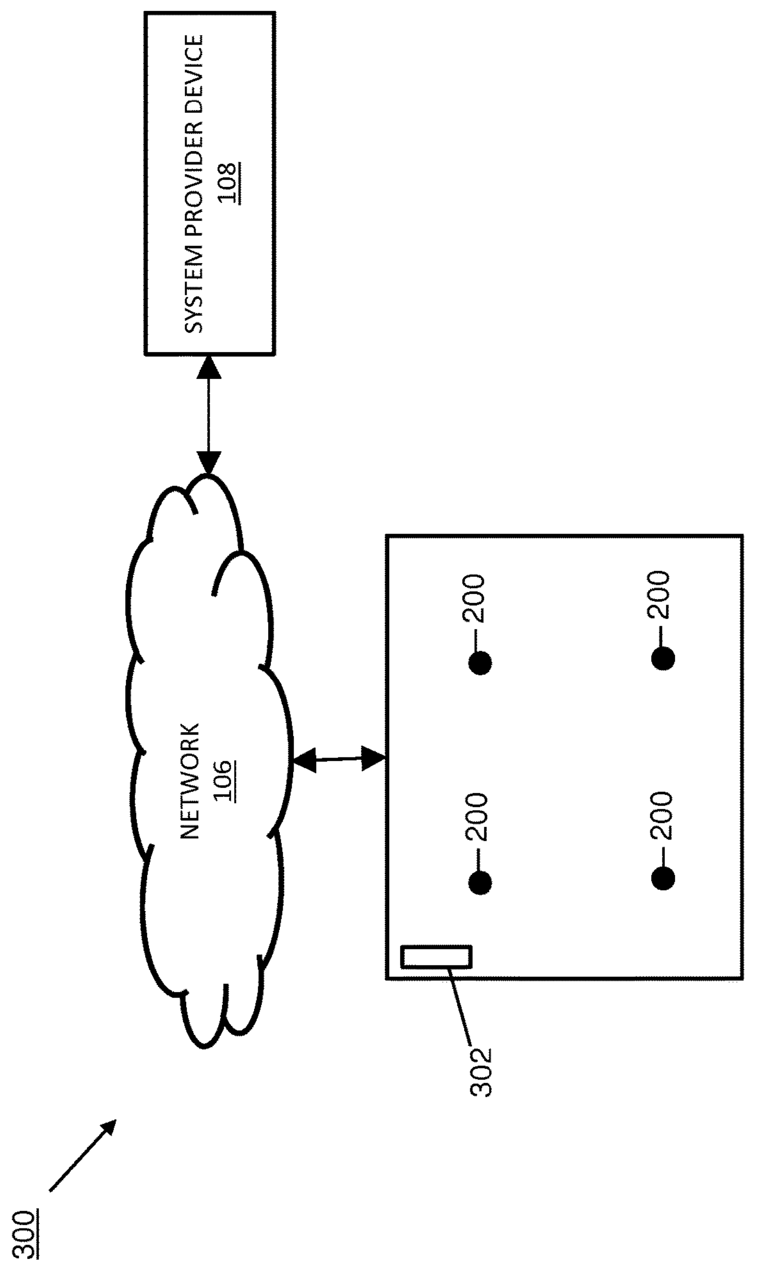
FIG. 3A is a schematic view illustrating an embodiment of the audio control system of FIG. 1 that includes a plurality of the beacon devices of FIG. 2.
Figure 3B:
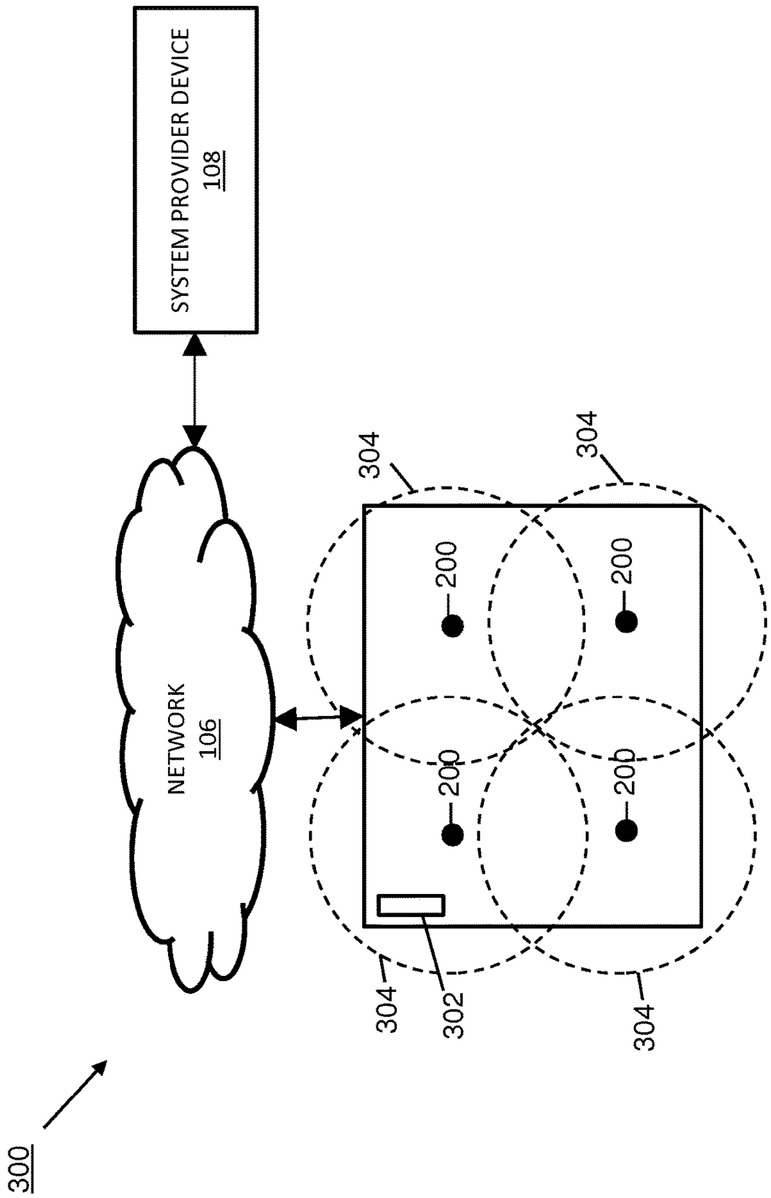
FIG. 3B is a schematic view illustrating an embodiment of the audio control system of FIG. 3A with the beacon devices providing communication areas.

Referring now to FIGS. 3A and 3B, an embodiment of an audio control system 300 is illustrated. As illustrated in FIG. 3A, the audio control system 300 may be provided by positioning a plurality of the beacon devices 200, discussed above with reference to FIG. 2, in and around the business physical location associated with the business 102, discussed above with reference to FIG. 1. As discussed above, the beacon devices 200 may be sized such that they may be inconspicuously positioned virtually anywhere in or around the business physical location. For example, the beacon devices 200 may be positioned on a ceiling within various areas of an interior of the business physical location and/or in any other part of the business physical location associated with the business 102. Each of the beacon devices 200 in the audio control system 300 may be configured to wirelessly communicate, via its first communications system 204, with a local network communication device 302 such as, for example, a WiFi wireless router or other computing system connected to a network such as the Internet.

Referring now to FIG. 3B, in operation, each of the beacon devices 200 is configured to create a communication area 304 with its second communications system 208. For example, the second communications system 208 in each beacon device 200 may be a BLE communications device that provides an approximately 100 foot radius communications area. Depending on a desired coverage area, the power of individual beacon devices may be turned up or down to cover different sized areas, such that individual beacons within the business location may have the same or different size coverage areas. However, other communications systems providing other communications areas are envisioned as falling within the scope of the present disclosure. As can be seen in the illustrated embodiment, the beacon devices 200 may be positioned in and around the business physical location associated with the business 102 such that the communications areas 304 abut, overlap, or otherwise provide coverage for any area of interest within and around the business physical location associated with the business 102. One of skill in the art in possession of the present disclosure will appreciate that different configurations of the beacon devices 200 within and around the business physical location associated with the business 102 may be selected to cover any area within and around the business physical location with a communications area 304.

As discussed in further detail below, each of the beacon devices 200 are configured to communicate with noise cancelling headphones, radios, Bluetooth® headsets, headphone sets, user devices, or other audio devices at the business 102 location within their respective communications area 304 (e.g., using the second communication system 208) to deliver a stimulus received from the local network communication device 302, as provided by the system provider device 108, and thereby disable a noise-cancelling function, lower a volume setting, mute, or pause any of the noise cancelling headphones, radios, Bluetooth® headsets, headphone sets, user devices, or other audio devices at the business 102 location.

In some of the figures associated with the embodiments discussed below, the beacon devices 200 and their communications areas 304 are not shown for the sake of clarity, but it should be understood that the communications of one or more external stimuli from beacon communication devices may be accomplished using beacon devices providing communications areas such as the beacon devices 200 and communications areas 304 illustrated in FIGS. 3A and 3B. While a specific example of an audio control system 300 is provided, one of skill in the art in possession of the present disclosure will recognize that a wide variety of different business physical locations may incorporate the beacon devices 200 in a variety of different manners while remaining within its scope. It should also be noted that in some examples, one or more external stimuli may be communicated without the use of beacon devices, for example by using the local network communication device 102 to communicate directly with any of the noise cancelling headphones, radios, Bluetooth® headsets, headphone sets, user devices, or other audio devices at the business 102 location. Additional examples, including embodiments implemented in a transportation scenario, are described below with reference to FIGS. 8, 9A, and 9B.

In the embodiments discussed below, the audio control systems and methods involve a system provider using a system provider device to detect events associated with a business 102 location alert and/or emergency through communication with the local network communication device 302, and in response, communicate through the beacon devices 200, with any of the noise cancelling headphones, radios, Bluetooth® headsets, headphone sets, user devices, or other audio devices at the business 102 location. In some embodiments, the audio control systems and methods may alternately involve receiving a voice command, by any of the noise cancelling headphones, radios, Bluetooth® headsets, headphone sets, user devices, or other audio devices, where the voice command serves as an external stimuli, as discussed above. In some embodiments, events associated with a business 102 location alert and/or emergency may include events such as floods, hurricanes, tornadoes, fires, toxic gas releases, chemical spills, radiological accidents, explosions, civil disturbances, workplace violence situations, as well as others described below and/or which may be known in the art. In some examples, the business 102 may communicate with the system provider device 108, by the local network communication device 302, to implement one or more functions of the audio control system 300 in the event of an alert and/or emergency situation, as described herein. In some cases, the system provider device 108 may receive a communication, by way of the network 106, from a third-party alert system, a local authority, a state authority, or a national authority, such as the Federal Communication Commission's (FCC) Emergency Alert System (EAS). The system provider device 108 may analyze the one or more stimuli received, for example from the business 102, from voice commands, or from third-party systems and determine an appropriate action. The system provider device may also store individual and/or business information (e.g., user device information, audio device information, business physical location, individual physical location, alert and/or emergency protocol information, etc.) in a database located at the business physical location associated with the business 102 and/or the individuals, or at a remote database, for example, by way of a network connection. In some embodiments, the system provider device may be a device that is local to the business physical location associated with the business 102 and that communicates with the beacon devices 200 using the local network communication device 302.

Furthermore, FIGS. 1, 3A, and 3B illustrate a business physical location associated with the business 102 where the physical location is a single building, with the beacon devices 200 positioned to provide communications areas 304 that cover the interior of that single building, a parking area of the single building, and/or outside sections of that single building. However, beacon devices 200 may be positioned virtually anywhere within and around a business physical location. For example, beacon devices 200 may be positioned to provide coverage to portions of a parking area, throughout an entire parking lot, at the entrances or exits of that parking lot, and/or anywhere else relative to that parking lot in order to communicate with any nearby audio devices, such as noise cancelling headphones, radios, Bluetooth® headsets, headphone sets, user devices, or other audio devices. In some examples, the first communication system may be connected to WiFi networks available outside the business physical location in order to communicate with a system provider device. In other examples, the first communication system may be a cellular communications system that allows the beacon devices to be positioned anywhere in range of a cellular communications tower, allowing beacon devices to be positioned in virtually any physical location when providing the audio control system. As such, one or more events (e.g., alert and/or emergency events) associated with disabling a noise-cancelling function, lowering a volume setting, muting, or pausing any of noise cancelling headphones, radios, Bluetooth® headsets, headphone sets, user devices, or other audio devices may be performed, at least in part, based on events performed and/or occurring outside a business physical location.

Figure 4:
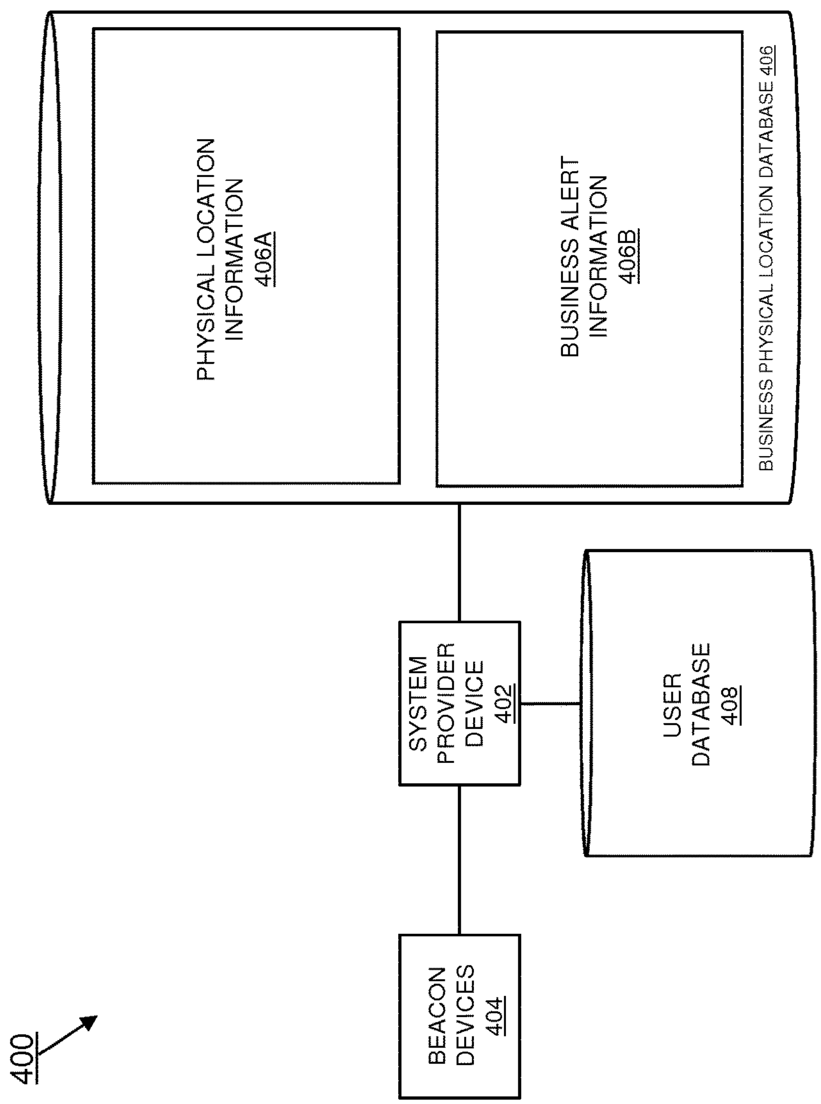
FIG. 4 is a schematic view illustrating an embodiment of a system provider device connected to beacon devices in the audio control system of FIG. 3 and to a user database and a business physical location database to provide an audio control system.

Referring to FIG. 4, an embodiment of a portion of an audio control system 400 is illustrated that may be used to implement one or more embodiments of the systems and methods of the present disclosure such as, for example, to detect events associated with a business 102 location, residence location, or transportation alert and/or emergency as well as voice commands, as described below. The audio control system 400 includes a system provider device 402 communicatively coupled to beacon devices 404 (which may be the beacon devices 200 discussed above), a business (or residence, or transportation) physical location database 406, and a user database 408. While illustrated as single databases, the business physical location database 406 and user database 408 may include multiple databases that may be located at the business physical location associated with the business 102 and/or coupled to system provider device 402 by a network (e.g., the Internet).

In an embodiment, the business physical location database 406 may store business physical location information 406A and business alert information 406B. The business alert information may include for example, a list of individuals at the business physical location, a list of audio devices at the business physical location, associations between individuals and audio devices, a list of events (e.g., emergency and/or alert events) that may be used to trigger a response by the system provider device 402, and/or other business alert information as known in the art. In some examples, the business alert information may be updated in real-time as individuals (and their audio devices) move into and out of the range of the beacons 200 at the business physical location, as emergency and/or alert events at the business location unfold, or as weather or other events change. Furthermore, the user database 408 may store user information such as user device information, user device preferences, and/or a variety of other user information known in the art.

Figure 5:
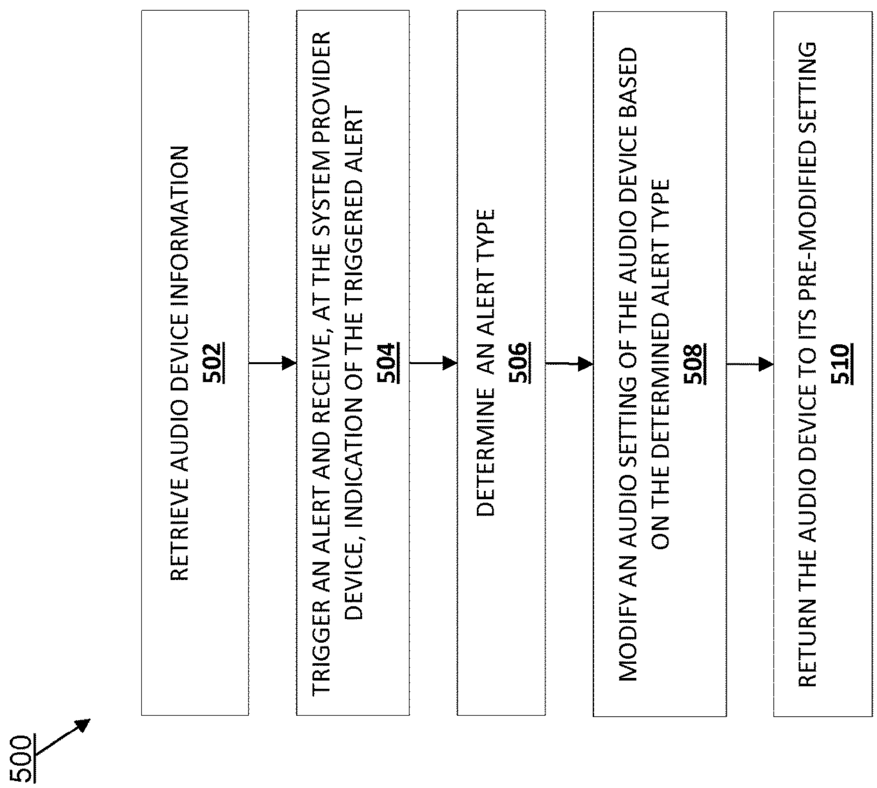
FIG. 5 is a flow chart illustrating an embodiment of a method for providing control of an audio device.

Referring now to FIG. 5, an embodiment of a method 500 for controlling one or more audio devices in response to at least one stimulus is illustrated. One of skill in the art in possession of the present disclosure will recognize that the method 500 may be performed for a plurality of different businesses (or residences) at a variety of physical locations, as well as for a plurality of different public or private transportation providers, as described below. The method 500 begins at block 502 where audio device information is retrieved by the system provider device. For example, audio device information may be automatically communicated (e.g., via the beacon devices 200), by the network 106, and to the system provider device 108. The retrieved audio device information may be updated in real-time as individuals (and their audio devices) move into and out of the range of the beacons 200 at the business physical location, as described above. In some embodiments, the audio device information includes device specific information, such as a device manufacturer, a device model, a device type, or a device specific frequency at which the audio device will respond to external commands (e.g., remote commands), and which may be used by the system provider device 108, to lower a volume of an audio device, mute an audio device, or pause an audio device, among others. While some examples of device specific information collected by the system provider device 108 have been given, one of skill in the art in possession of the present disclosure will recognize that a wide variety of different device specific information will fall within the scope of the present disclosure.

The method 500 proceeds to block 504 where an alert is triggered and received by the system provider device. In some embodiments, the business 102 may trigger an alert, for example, by way of the local network communication device 302 in communication with the system provider device 108. In some cases, the alert may be triggered by a third-party alert system, a local authority, a state authority, or a national authority in communication with the system provider device 108. In particular, with reference to FIGS. 6, 7A, and 7B, a specific example of the method 500 is illustrated and described.

Figure 6:
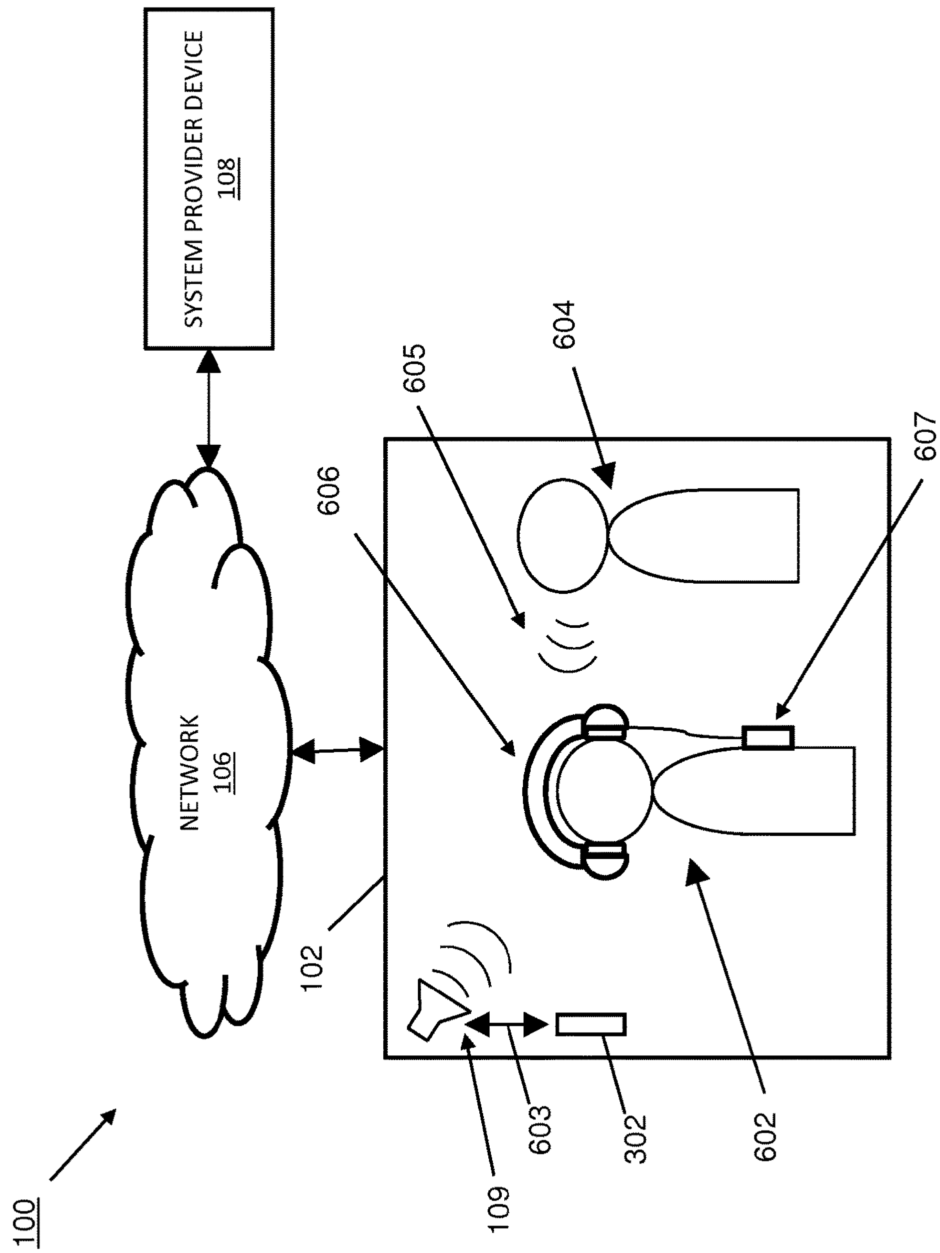
FIG. 6 is a schematic view illustrating an embodiment of an audio control system including a local network communication device.

Referring first to FIG. 6, an individual 602 at the business 102 location is illustrated. In particular, the individual 602 is wearing headphones 606, which may include noise cancelling headphones. In some examples, the individual 602 may be listening to music, or the individual 602 may be working in a noisy area of the business 102 location, and may be taking advantage of a noise-cancelling function of the headphones 606. With reference to FIG. 6, and in an embodiment of block 504, an alert may be triggered according to one of a plurality of methods. In one example, an alarm 109 (e.g., a fire alarm) may, upon activation, communicate with the local network communication device 302 (as indicated by arrow 603), which thereby communicates an indication of the triggered alert to the system provider device 108 by way of the network 106. In some examples, responsive to activation of the alarm 109, an individual at the business 102 location may manually send an indication of the triggered alert, by the local network communication device 302, to the system provider device 108. In still other examples, in response to activation of the alarm 109, an individual 604 at the business 102 location may speak a key phrase 605, which may be detected by a microphone embedded in the headphones 606 or by a microphone integrated within a user device 607 to which the headphones 606 are connected. As used herein, a "key phrase" may include a predefined emergency word or phrase, which may be stored in the business physical location database, and when detected by the system provider device 108, causes the system provider device 108 to implement one or more aspects of the audio control system 100. Responsive to detection of such a key phrase, the user device 607 and/or the headphones 606 may communicate an indication of the triggered alert to the system provider device 108, for example by way of a beacon device (as described above) and the network 106. In one or more of the embodiments described herein, communication of the indication of the triggered alert to the system provider device 108 may also include audio device information for one or more audio devices, such as the headphones 606, at the business 102 physical location. In other examples, audio device information may be automatically communicated (e.g., via the beacon devices 200 and prior to activation of the alarm 109), via the network 106, and to the system provider device 108, as described above with reference to block 502. While some examples of triggering an alert and communicating the triggered alert to the system provider device have been provided, those skilled in the art in possession of the present disclosure will recognize other methods of triggering an alert and communicating an indication of the triggered alert to the system provider device, while remaining within the scope of the present disclosure.

The method 500 proceeds to block 506 where an alert type is determined by the service provider device. For example, in some embodiments, depending on the source of the triggered alert (e.g., a business, a residence, the FCC's EAS, etc.) and/or depending on identifying metadata that may be transmitted with the indication of the triggered alert to the system provider device 108, an alert may be classified into any of a plurality of threat and/or severity levels. By way of example, some high severity alerts may include events such as floods, hurricanes, tornadoes, fires, toxic gas releases, chemical spills, radiological accidents, explosions, civil disturbances, workplace violence situations, as described above. In some embodiments, other less severe (or non-severe) alerts may include, for example, informational notices and/or less time sensitive alerts. In various examples, depending on the alert type and/or alert severity level, as determined by the system provider device 108, the system provider device 108 may modify the audio settings of audio devices at the business 102 physical location in accordance with one or more of a plurality of different audio setting modifications, as described below.

The method 500 then proceeds to block 508 where the system provider device modifies an audio setting of one or more audio devices at the business 102 physical location. In some embodiments, the modification of the audio setting may be based on the determined alert type at block 506. With reference to the example of FIG. 6, in an embodiment of block 508, the system provider device 108 may communicate with the headphones 606, for example by the network 106 (and optionally the local network communication device 302 and one or more beacon devices) to disable a noise-cancelling feature of the headphones 606 so that the individual 602 is readily able to hear the alarm 109 and/or the individual 604. Alternatively, in some embodiments, the system provider device 108 may communicate, by the network 106, with the user device 604 to which the headphones 606 are connected, to lower the volume, mute, or pause, any audio source playing via the headphones 606. In various embodiments, depending on the alert type determined at block 506, the system provider device 108 may mute or pause the audio source (e.g., for more severe alerts), or in some cases the system provider device may lower the volume of the headphones 606 to a predetermined level (e.g., for less severe alerts). Additionally, in some examples, depending on the alert type determined at block 506, a duration of maintaining the modified audio settings may be varied. By way of illustration, for severe alerts (e.g., fires, chemical spills, explosions, etc.), the modified audio setting (e.g., mute/pause) may remain in effect for the duration that the audio device remains at the business 102 physical location, unless overridden by an authorized user. Alternatively, for less or non-severe alerts (e.g., such as informational notices), the modified audio setting (e.g., lowered volume, mute, pause) may remain in effect for a predetermined duration, such as for example for the duration of the informational notice (e.g., seconds to minutes).

The method 500 then proceeds to block 510 where the system provider device returns the audio device to its pre-modified setting. For example, after the passage of the predetermined duration of time, or after the audio modification is overridden by an authorized user, the system provider device 108 may communicate, by the network 106, with the headphones 606 or the user device 604, to return the volume to its previous setting, unmute the audio, un-pause the audio, and/or generally return any modified settings of the audio device to their pre-modified settings.

Figure 7B:
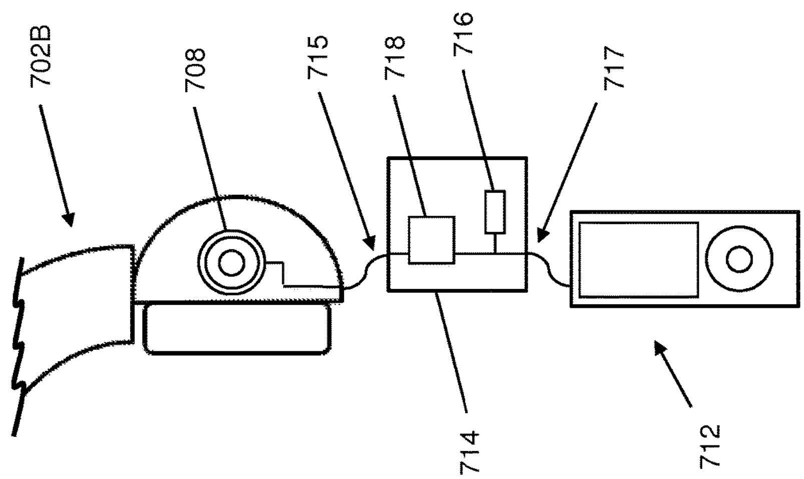
FIG. 7B is a schematic view illustrating an embodiment of a headphone set connected to an audio device by way of a pass-through device, in accordance with some embodiments.
Figure 7A:
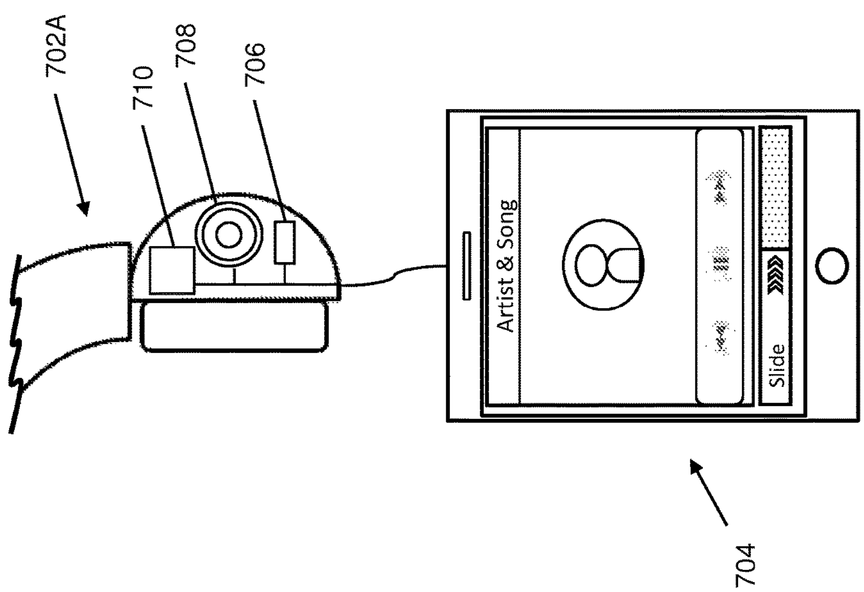
FIG. 7A is a schematic view illustrating an embodiment of a noise-cancelling headphone set connected to a mobile device, in accordance with some embodiments.

Referring to FIG. 7A, illustrated therein is a schematic view of a portion 702A of headphones, which may be a portion of the headphones 606 discussed above, connected to a user device 704, which may be the user device 607 discussed above. In the example of FIG. 7A, the user device 704 may include a mobile phone (e.g., a smartphone) capable of wireless communication for example by Bluetooth® Low Energy (BLE), WiFi, or cellular communication, and which includes integrated input/output components such as a speaker and a microphone, among others. Additionally, in the example shown in FIG. 7A, the headphones may include noise cancellation headphones having a microphone 706, a speaker 708, and a circuit 710. In some embodiments, the circuit 710 includes a noise cancellation circuit, which may be used to reduce ambient noise, and as described herein may cause unwanted obstructions to an individual's hearing, particularly during an alert and/or emergency situation. In some example, the circuit 710 may further include one or more communications components capable of wireless communication for example by Bluetooth® Low Energy (BLE), WiFi, or cellular communication. In some embodiments, the circuit 710 also includes a control circuit capable of modifying one or more audio settings (e.g., volume and/or playback controls) of the user device 704. In an example of block 504 of the method 500, the microphone 706 (or a microphone of the user device 704) may detect a key phrase, a fire alarm, a high-frequency sound, or other alert, and the user device 704 and/or the headphones, by the circuit 710, may communicate an indication of a triggered alert to the system provider device 108, for example by way of a beacon device (as described above) and the network 106. In an example of block 508 of the method 500, described above, the system provider device 108 may communicate with the headphones or the user device 704, to disable a noise-cancelling feature of the headphones or modify one or more audio settings of the user device 704.

Referring to FIG. 7B, illustrated therein is a schematic view of a portion 702B of headphones, which may be a portion of the headphones 606 discussed above, connected to a user device 712, which may be the user device 607 discussed above. In the example of FIG. 7B, the user device 712 may include an MPEG-1 or MPEG-2 Audio Layer III (MP3) player, a cassette player, a radio, a compact disc (CD) player, or other portable audio player. In various embodiments, the user device 712 may not include any wireless communication capability, or integrated input/output components such as a speaker and a microphone, as in the example of FIG. 7A. Additionally, in the example shown in FIG. 7B, the headphones may not include a noise cancellation circuit, or any wireless communication capability, as in the example of FIG. 7A. In some cases, the headphones of FIG. 7B may be simple ear bud type headphones. While the example of FIG. 7B includes basic headphones and a user device 712, which on their own may not be able to take advantage of the embodiments disclosed herein, the example of FIG. 7B further includes a pass-through device 714 coupled between (e.g., via ports 715 and 717) the headphones and the user device 712. The illustrated pass-through device 714 allows the basic headphones and the user device 712 to take full advantage of the embodiments disclosed herein. By way of example, in some embodiments, the pass-through device 714 includes a microphone 716 and a circuit 718, where the circuit 718 may include one or more communications components capable of wireless communication for example by Bluetooth® Low Energy (BLE), WiFi, or cellular communication. In some embodiments, the circuit 718 also includes a control circuit capable of modifying one or more audio settings (e.g., volume and/or playback controls) of the user device 712. In an example of block 504 of the method 500, the microphone 716 may detect a key phrase, a fire alarm, a high-frequency sound, or other alert, and the pass-through device 714, by the circuit 718, may communicate an indication of a triggered alert to the system provider device 108, for example by way of a beacon device (as described above) and the network 106. In an example of block 508 of the method 500, described above, the system provider device 108 may communicate with the pass-through device 714, by the circuit 718, to modify one or more audio settings of the user device 712.

Figure 8:
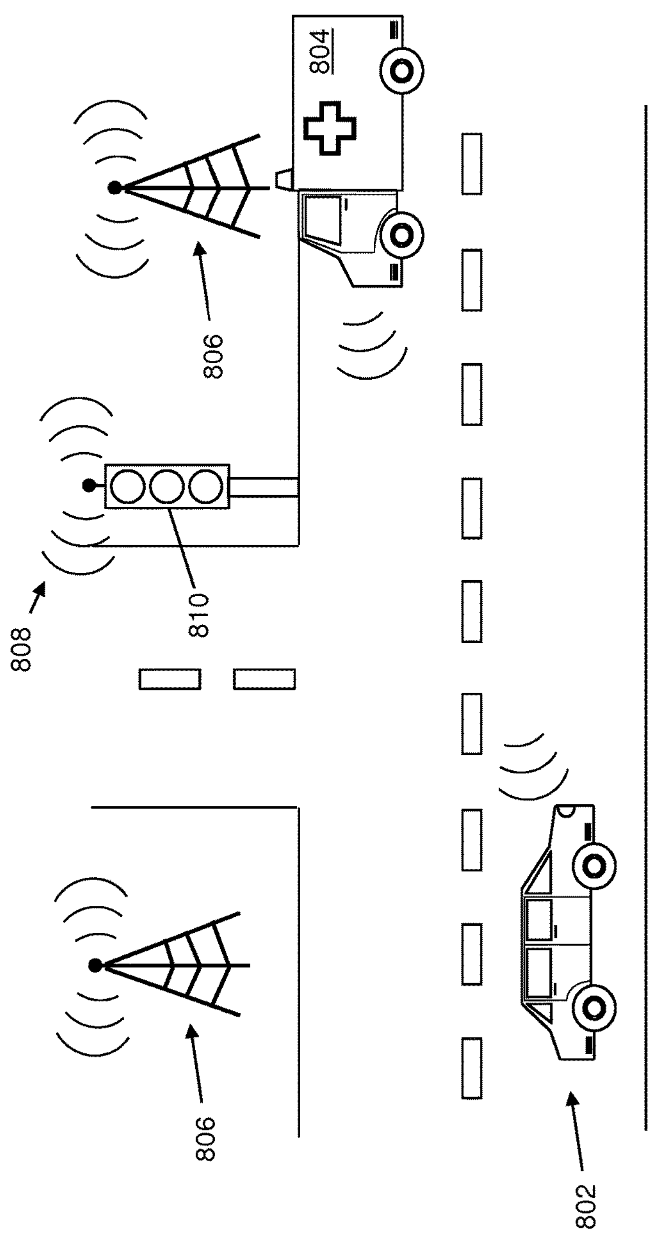
FIG. 8 is a schematic view illustrating an embodiment of an audio control system implemented in a transportation scenario.
Figure 9A:
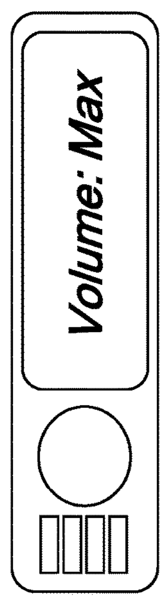
FIG. 9A is a schematic view illustrating an embodiment of a front panel display of a car stereo system showing a first volume setting.
Figure 9B:
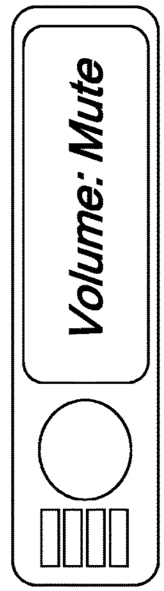
FIG. 9B is a schematic view illustrating an embodiment of a front panel display of a car stereo system showing a second volume setting.

Referring now to FIGS. 8, 9A, and 9B, an alternative embodiment of the method 500 for controlling one or more audio devices is illustrated. Referring first to FIG. 8, the present example illustrates control of an audio system of a vehicle 802 by an emergency vehicle 804. As described above, a driver and/or passengers traveling in the vehicle 802 may be listening to music very loudly (e.g., FIG. 9A illustrates a front panel display of a car stereo system showing a volume setting set to a very high 'maximum' level), or the driver and/or passengers may be wearing headphones or a Bluetooth® headset (e.g., to listen to music or while on their mobile phone), and thus may not hear an approaching siren of the emergency vehicle 804. In an embodiment of block 502 of the method 500, audio device information, as described above, may be retrieved by the system provider device. For example, audio device information may be communicated from a transceiver of the vehicle 802 (which may further be in communication with user devices within the vehicle 802) to the system provider device 108 by one or more radio (or cellular) towers 806 or by a transceiver 808 mounted to a nearby traffic signal 810 (or other traffic signage) in communication with the network 106. The retrieved audio device information may be updated in real-time as vehicles (and any audio device therein) move into and out of an alert region, which may be defined for example as a region having a defined radius 'R' around the emergency vehicle 804 or as a region a distance 'D' in front of the emergency vehicle 804. While some examples of an alert region have been described, one of ordinary skill in the art in possession of the present disclosure will recognize other regions which may be used as suitable alert regions, while remaining within the scope of the present disclosure.

In an embodiment of block 504 of the method 500, an alert is triggered and an indication of the triggered alert received by the system provider device. In the embodiment illustrated in FIG. 8, the emergency vehicle 804 may trigger an alert, for example, by way of a radio transceiver in communication with the system provider device 108 through one or more of the radio towers 806 or transceiver 808. In some embodiments, the alert may be automatically triggered in conjunction with activation of a siren of the emergency vehicle 804. In some cases, the alert may be triggered by a third-party alert system, a local authority, a state authority, or a national authority in communication with the system provider device 108. In some examples, the alert may be triggered by an emergency services operator (e.g., a 911 operator), by other emergency response personnel, or by an automated emergency response system. In one or more of the embodiments described herein, communication of the indication of the triggered alert to the system provider device 108 may also include audio device information for one or more audio devices within the vehicle 802 such as a vehicle 802 stereo system, as well as headphones, mobile devices, or other audio devices within the vehicle 802. In other examples, audio device information may be automatically communicated from a transceiver of the vehicle 802 (which may further be in communication with user devices within the vehicle 802) to the system provider device 108 as described above.

As described above for an embodiment of block 506, and with reference to the example of FIG. 8, an alert type may be determined by the service provider device. In various embodiments, depending on the source of the triggered alert (e.g., ambulance, police, fire/rescue, emergency services provider, etc.) and/or depending on identifying metadata that may be transmitted with the indication of the triggered alert to the system provider device 108, an alert may be classified into any of a plurality of threat and/or severity levels. In the example of FIG. 8, the alert triggered by (or responsive to)

the approaching emergency vehicle 804 may be classified as a high severity alert. In some embodiments, a severity alert level may be determined by a distance between the emergency vehicle (e.g., the emergency vehicle 804) and an approaching vehicle (e.g., the vehicle 802). In some examples, depending on the alert type and/or alert severity level, as determined by the system provider device 108, the system provider device 108 may modify the audio settings of one or more audio devices within the vehicle 802 such as a vehicle 802 stereo system, as well as headphones, mobile devices, or other audio devices within the vehicle 802.

In an embodiment of block 508 of the method 500, the system provider device modifies an audio setting of one or more audio devices within the vehicle 802. In some embodiments, the modification of the audio setting may be based on the determined alert type at block 506. With reference to the example of FIG. 8, in an embodiment of block 508, the system provider device 108 may communicate with the vehicle 802 stereo system, for example by the one or more radio towers 806 and/or the transceiver 808 in communication with the network 106, to reduce a volume or mute the vehicle 802 stereo system (e.g., FIG. 9B illustrates the front panel display of the car stereo system showing a volume setting set to a low 'mute' level). In this way, the driver of the vehicle 802 is readily able to hear the approaching siren of the emergency vehicle 804. Alternatively, in some embodiments, the system provider device 108 may communicate, for example by the one or more radio towers 806 and/or the transceiver 808 in communication with the network 106, with one or more audio devices (e.g., smartphones, headphones, etc.) within the vehicle 802, to lower the volume, mute, or pause, any audio source playing via such audio devices. In some embodiments, if the vehicle 802 is within a low alert region (farther from the emergency vehicle 804), the system provider device 108 may lower the volume of the vehicle 802 stereo, or other audio devices within the vehicle 802, to a predetermined level. In some examples, if the vehicle 802 is within a high alert region (closer to the emergency vehicle 804), the system provider device 108 may mute or pause any audio source within the vehicle 802. Additionally, in various examples, a duration of the modified audio settings may be varied, for example based on the determined alert type or based on a vehicle's position with respect to one or more defined alert regions. By way of illustration, with reference to the example of FIG. 8, the modified audio setting (e.g., muted stereo as shown in FIG. 9B) may remain in effect for the duration that the vehicle 802 remains within a high alert region, which in the present case may include a region facing the approaching emergency vehicle 804. In an embodiment of block 510 of the method 500, the system provider device returns the audio device to its pre-modified setting. For example, in some embodiments, once the emergency vehicle 804 passes the vehicle 802, the vehicle 802 may transition to a low alert or no-alert region, and the volume of the vehicle 802 stereo may be un-muted or may be incrementally increased as the distance between the emergency vehicle 804 and the vehicle 802 increases.

Figure 10:
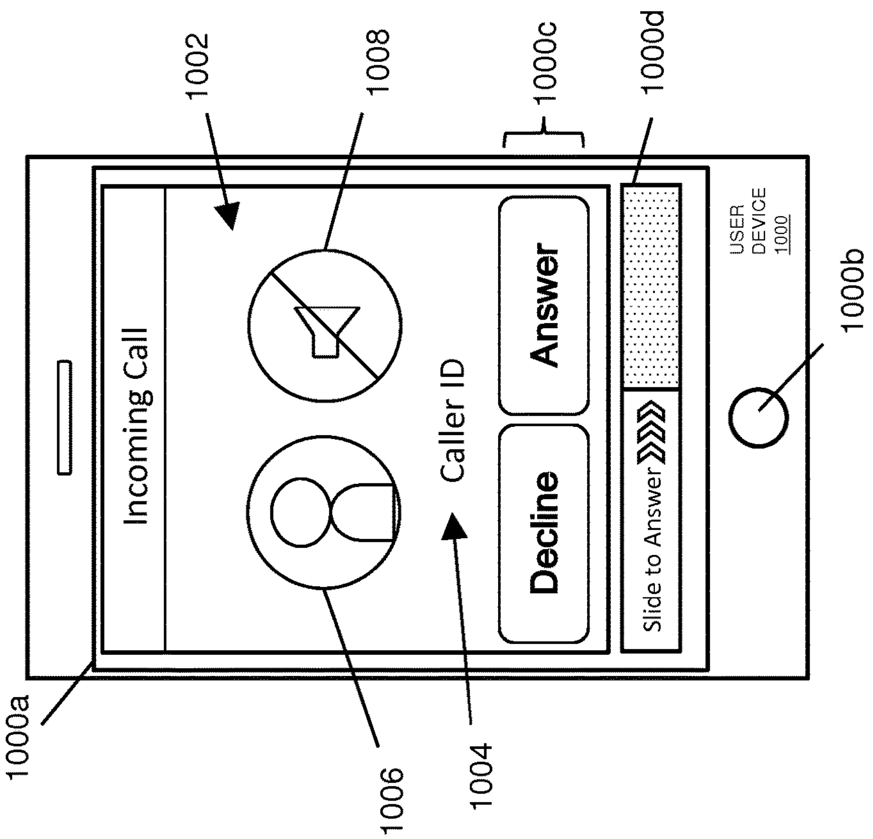
FIG. 10 is a screen shot illustrating an embodiment of a user device displaying an incoming phone call.

Referring now to FIG. 10, an example of another embodiment which employs one or more steps of the method 500 is illustrated. In particular, FIG. 10 shows a user device 1000 that includes a display 1000*a*, for example having a touch-screen user interface, and an input button 1000*b*. While the user device 1000 is illustrated and described as a mobile phone, a variety of other user devices are envisioned as falling within the scope of the present disclosure. In some embodiments, a location of the user device 1000 may be determined by the system provider (e.g., using GPS coordinates, triangulation, or other location determination techniques). In particular, in some embodiments, the system provider may determine that the user device 1000 is within an alert region, which may be defined as described above. In addition, alternative alert regions may be defined and may include, for example, a nursery, a hospital, a library, a church, a theater, or other area where a quiet atmosphere is required and/or expected to be maintained. In various embodiments, a user associated with the user device 1000 may receive a phone call, as indicated in a display 1002 of the user device 1000, while within such an alert region. In the example of FIG. 10, information regarding the incoming phone call may be displayed in the display 1002 and may include caller identification (ID) information 1004 and a photo or icon 1006. In addition, the display 1002 may also include buttons 1000*c* to decline or answer the incoming call, as well as a slider 1000*d* that may also be used to answer the incoming call. In various examples, and in accordance with one or more embodiments disclosed herein, the system provider device modifies an audio setting of the user device 1000 while the user device remains within the alert region. In the example of FIG. 10, the system provider device mutes a ringtone of the user device 1000, as indicated by icon 1008, while the user device 1000 remains within the alert region. In some embodiments, the system provider device may lower the ringtone volume to a low level while the user device 1000 remains within the alert region. As described above with reference to block 510 of the method 500, the system provider device returns the user device 1000 to its pre-modified setting. For example, in some embodiments, once the user device 1000 is determined (e.g., by the system provider) to be outside the alert region, the system provider may un-mute the ringtone of the user device 1000 and/or return the user device 1000 to its pre-modified audio setting.

Thus, systems and methods have been described that provide for controlling an audio device (e.g., including a stereo, headphones, etc.) in response any one of a plurality of external stimuli. The systems and methods described herein may be used as a quick and reliable way to remove hearing impairments, for example such as headphones, car stereos, home theater systems, or other such audio devices as known in the art, particularly during emergency situations. In various examples, and in accordance with the embodiments described herein, a system provider device may retrieve audio device information and receive an indication of a triggered alert. As described above, the triggered alert may be provided by one or more of a plurality of stimuli automatically, for example in response to an emergency alert (e.g., a fire alarm, a emergency vehicle siren, an EAS alert, etc.), or manually by an individual user, an emergency operator, or other individual. The system provider may then determine an alert type and severity level. In response, the system provider may modify an audio setting of one or more audio devices (e.g., lower a volume, mute, pause, etc.), based in part on the determined alert type and severity level. In some embodiments, the system provider device may then return the one or more audio devices to their pre-modified (i.e., original) setting. Thus, the embodiments described herein provide quick and reliable way to remove hearing impairments that may be introduced by any of a plurality of audio device such as, for example, headphones, car stereos, home theater systems, or other such audio devices as known in the art, particularly during emergency situations.

Figure 11:
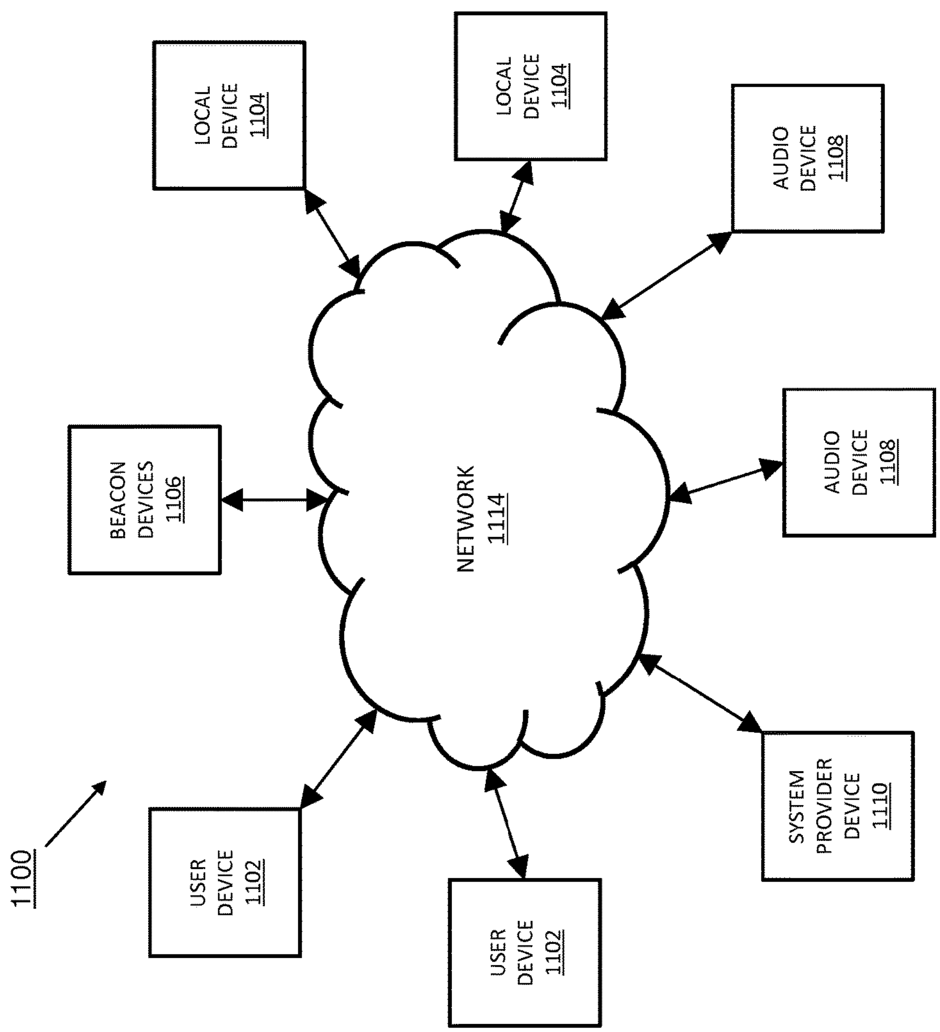
FIG. 11 is a schematic view illustrating an embodiment of a networked system.

Referring now to FIG. 11, an embodiment of a network-based system 1100 for implementing one or more processes described herein is illustrated. As shown, the network-based system 1100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 11 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1100 illustrated in FIG. 11 includes a plurality of user devices 1102, a plurality of local devices 1104, a plurality of beacon devices 1106, a plurality of audio devices 1108, and/or a system provider device 1110 in communication over one or more networks 1114. The user devices 1102 may be the user devices discussed above and may be operated by the users and/or individuals discussed above. The local devices 1104 and beacon devices 1106 may be the local network communication devices and beacon devices discussed above and may be operated by the businesses discussed above. The audio devices 1108 may be the audio devices discussed above and may standalone audio devices or may be integrated, in some cases, with the user devices as discussed above. The system provider devices 1110 may be the system provider devices discussed above and may be operated by the system providers discussed above.

The user devices 1102, local devices 1104, beacon devices 1106, audio devices 1108, and/or system provider device 1110 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1100, and/or accessible over the network 1114.

The network 1114 may be implemented as a single network or a combination of multiple networks. For example, in various embodiments, the network 1114 may include the Internet and/or one or more intranets, landline networks, wireless networks, and/or other appropriate types of networks.

The user devices 1102 may be implemented using any appropriate combination of hardware and/or software configured for wired and/or wireless communication over network 1114. For example, in one embodiment, the user devices 1102 may be implemented as a personal computer of a user in communication with the Internet. In other embodiments, the user devices 1102 may be a smart phone, wearable computing device, laptop computer, and/or other types of computing devices.

The user devices 1102 may include one or more browser applications which may be used, for example, to provide a convenient interface to permit the customer to browse information available over the network 1114. For example, in one embodiment, the browser application may be implemented as a web browser configured to view information available over the Internet.

The user devices 1102 may also include one or more toolbar applications which may be used, for example, to provide user-side processing for performing desired tasks in response to operations selected by the customer. In one embodiment, the toolbar application may display a user interface in connection with the browser application.

The user devices 1102 may further include other applications as may be desired in particular embodiments to provide desired features to the user devices 1102. In particular, the other applications may include a payment application for payments assisted by a payment service provider through a payment service provider device. The other applications may also include security applications for implementing user-side security features, programmatic user applications for interfacing with appropriate application programming interfaces (APIs) over the network 1114, or other types of applications. In addition, the other applications may include audio and/or video applications for playback of audio and/or video files. Email and/or text applications may also be included, which allow a user to send and receive emails and/or text messages through the network 1114. The user devices 1102 includes one or more user and/or device identifiers which may be implemented, for example, as operating system registry entries, cookies associated with the browser application, identifiers associated with hardware of the user devices 1102, or other appropriate identifiers, such as a phone number.

The local devices 1104 may be maintained, for example, by a conventional or on-line business, conventional or digital goods business, individual business, and/or application developer offering various products and/or services in exchange for payment to be received conventionally or over the network 1114.

The audio devices 1108 may be implemented using any appropriate combination of hardware and/or software configured for audio and/or video playback of one or more audio and/or video file types. Additionally, the audio devices 1108 may be configured for audio playback and/or reception of one or more of a plurality of media such as MPEG-1 or MPEG-2 Audio Layer III (MP3) files, cassette tapes, radio signals, and/or compact discs. Thus, in some embodiments, the audio devices 1108 may be implemented as an MP3 player, a cassette player, a radio, a CD player, or other portable audio player. In some embodiments, the audio devices 1108 include headphones, which may be configured to connect to one or more types of devices capable of audio and/or video playback, as described above. As such, in some embodiments, the audio devices 1108 may include headphones having a noise cancelling feature. In some cases, the audio devices 1108 may be configured for wired and/or wireless communication over network 1114. In some embodiments, the audio devices 1108 may be coupled to and/or integrated with a user device, such as the user devices 1102. Thus, in some embodiments, the audio devices 1108 may be implemented as a personal computer of a user in communication with the Internet. In other embodiments, the audio devices 1108 may be implemented as a smart phone, a wearable computing device, a laptop computer, and/or other types of computing devices.

Figure 12:
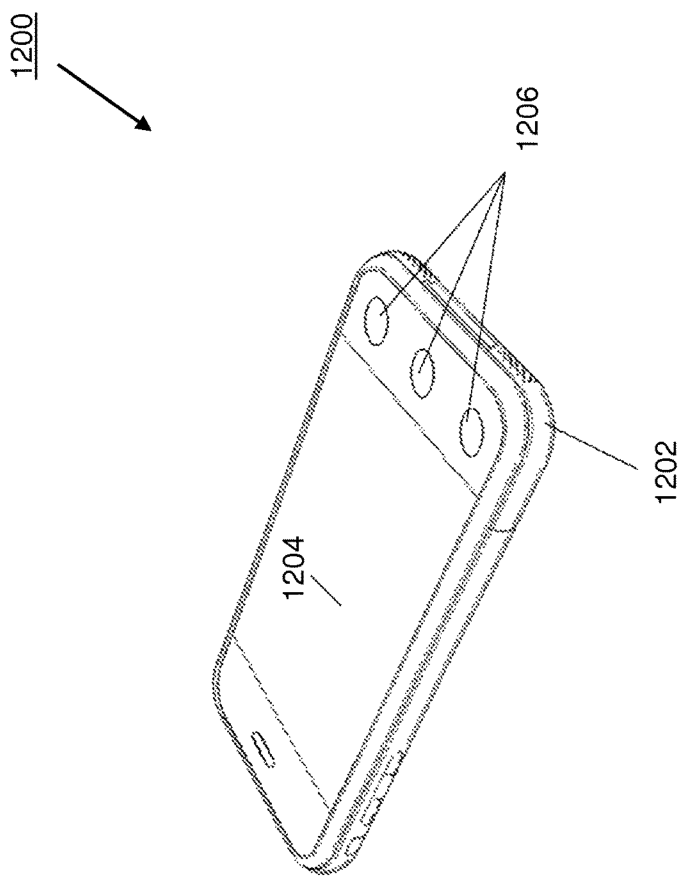
FIG. 12 is a perspective view illustrating an embodiment of a user device.

Referring now to FIG. 12, an embodiment of a user device 1200 is illustrated. The user device 1200 may be the user device 607, 704, 712, 1000, or 1102 discussed above. The user device 1200 includes a chassis 1202 having a display 1204, and an input device including the display 1204 and a plurality of input buttons 1206. One of skill in the art will recognize that the user device 1200 is a portable or mobile phone including a touch screen input device and a plurality of input buttons that allow the functionality discussed above with reference to the methods above. However, a variety of other portable/mobile user devices, desktop user devices, and/or other audio devices may be used in the methods discussed above without departing from the scope of the present disclosure.

Figure 13:
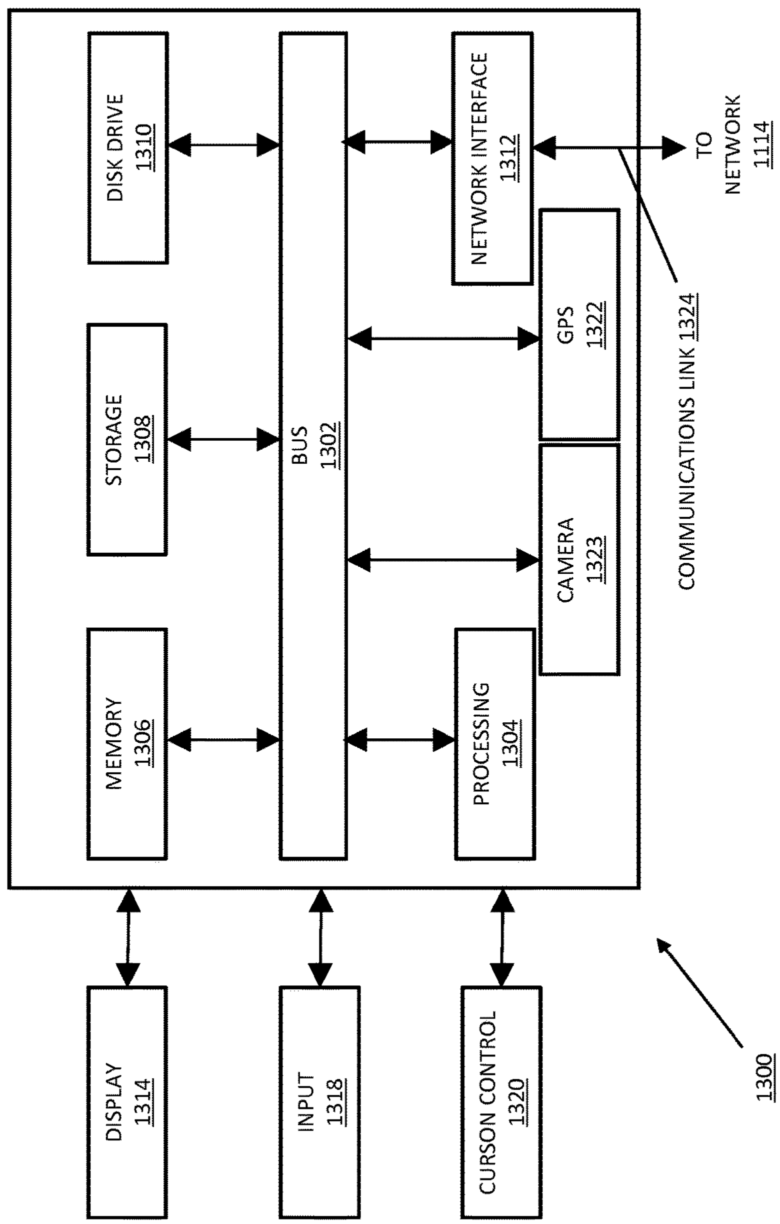
FIG. 13 is a schematic view illustrating an embodiment of a computer system.

Referring now to FIG. 13, an embodiment of a computer system 1300 suitable for implementing, for example, the user devices 607, 704, 712, 1000, or 1102, local devices 302, 1104, beacon devices 200, 404, or 1106, audio devices 107, 606, 702A, 702B, 714, 1108, and/or system provider devices 108, 402, or 1110, is illustrated. It should be appreciated that other devices utilized by users, businesses, beacon devices, beacon communication devices, audio devices, and/or system providers in the system discussed above may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), a location determination component 1322 (e.g., a Global Positioning System (GPS) device as illustrated, a cell tower triangulation device, and/or a variety of other location determination devices known in the art), and/or a camera component 1323. In one implementation, the disk drive component 1310 may comprise a database having one or more disk drive components.

In accordance with embodiments of the present disclosure, the computer system 1300 performs specific operations by the processor 1304 executing one or more sequences of instructions contained in the memory component 1306, such as described herein with respect to the user devices 607, 704, 712, 1000, or 1102, local devices 302, 1104, beacon devices 200, 404, or 1106, audio devices 107, 606, 702A, 702B, 714, 1108, and/or system provider devices 108, 402, or 1110. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 1114 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Figure 14:
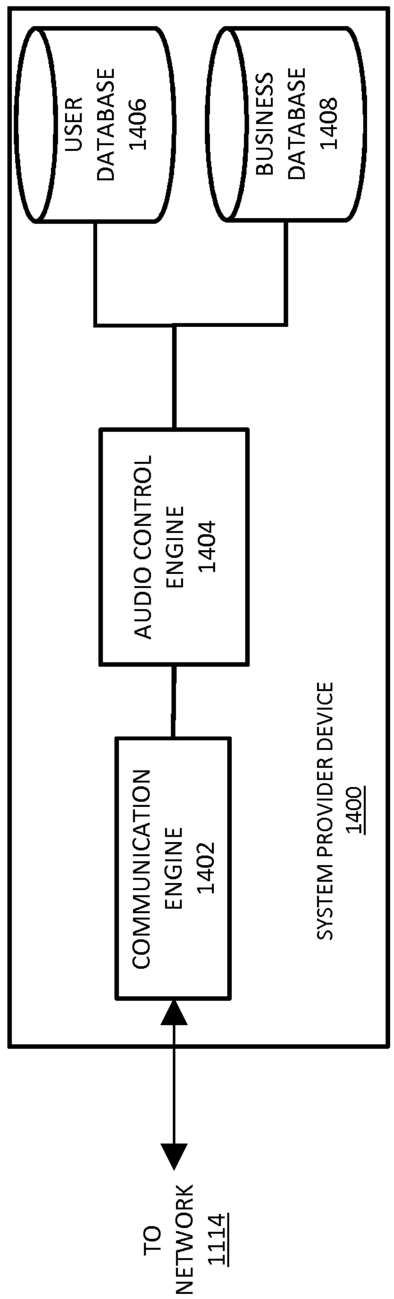
FIG. 14 is a schematic view illustrating an embodiment of a system provider device.

Referring now to FIG. 14, an embodiment of a system provider device 1400 is illustrated. In an embodiment, the device 1400 may be the system provider devices discussed above. The device 1400 includes a communication engine 1402 that is coupled to the network 1114 and to an audio control engine 1404 that is coupled to a user information database 1406 and a business information database 1408. The communication engine 1402 may be software or instructions stored on a computer-readable medium that allows the device 1400 to send and receive information over the network 1114. The audio control engine 1404 may be software or instructions stored on a computer-readable medium that, when executed by a processor, is configured to retrieve audio device information, receive an indication of a triggered alert, determine an alert type and severity, modify an audio setting of an audio device based on the determined alert type, return the audio device to its pre-modified setting, as well as provide any of the other functionality that is discussed above. While the databases 1406 and 1408 have been illustrated as located in the device 1400, one of skill in the art will recognize that they may be connected to the audio control engine 1404 through the network 1114 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:

at least one processing unit; and a memory storing computer executable instructions that, when executed by the at least one processing unit, cause the system to perform a method, comprising:

receiving, over a network and from a particular audio device, audio device information associated with the particular audio device;

determining, from the audio device information, one or more characteristics of the particular audio device, the one or more characteristics being used to identify the particular audio device;

receiving an alert condition over the network from at least one device, wherein the alert condition is associated with a location;

determining an alert type based, at least in part, on information associated with the alert condition;

automatically modifying an audio setting of the particular audio device using information associated with at least one of the one or more characteristics, wherein the modification to the audio setting is based, at least in part, on the determined alert type when the particular audio device is associated with the location; and in response to determining that the alert condition has ended, restoring the audio setting to a previous state.

2. The system of claim 1, wherein the audio device information includes data collected from a wireless transmitter.

3. The system of claim 1, further comprising instructions for changing the audio setting in response to detection of a spoken phrase.

4. The system of claim 1, wherein the alert type corresponds to one or more of a high severity alert, a low severity alert, and an informational alert.

5. The system of claim 1, wherein the particular audio device includes a noise-cancelling feature and wherein modifying the audio setting includes disabling the noise-cancelling feature.

6. The system of claim 1, wherein modifying the audio setting includes one or more of disabling a noise-cancelling feature, enabling a noise-cancelling feature, reducing a volume setting, increasing a volume setting, muting the audio device, un-muting the audio device, pausing playback of an audio source playing via the audio device, and un-pausing playback of the audio source.

7. The system of claim 1, further comprising instructions for determining a duration of time for maintaining the modified audio setting, wherein the duration of time is based, at least in part, on the alert type.

8. The system of claim 1, wherein the particular audio device comprises one or more of a mobile device, a noise-cancelling headphone set, a headphone set, a radio, a hands-free headset, and an MP3 player.

9. A method, comprising;

retrieving, through a network, identification information corresponding to a plurality of audio devices;

receiving an alert condition from one of a plurality of devices, wherein the alert condition includes location information;

determining an alert type based, at least in part, on alert information associated with the alert condition;

identifying at least one audio device using the identification information and the location information;

receiving, from the at least one audio device, one or more characteristics;

determining, information about the at least one audio device using the one or more characteristics;

using the information about the one or more characteristics to automatically modify an audio setting of the at least one identified audio device based on the determined alert type; and in response to determining that the alert condition has ended, restoring the audio setting of the at least one identified audio device to a previous state.

10. The method of claim 9, further comprising changing the audio setting in response to detection of a spoken phrase.

11. The method of claim 9, wherein the information corresponding to the plurality of audio devices includes data collected from a wireless transmitter beacon device.

12. The method of claim 9, wherein modifying the audio setting of the at least one identified audio device includes one or more of disabling a noise-cancelling feature, enabling a noise-cancelling feature, reducing a volume setting, increasing a volume setting, muting the audio device, un-muting the audio device, pausing playback of an audio source playing via the audio device, and un-pausing playback of the audio source.

13. A method, comprising:

receiving audio device identification information from an audio device over a network, the audio device identification information including one or more characteristics of the audio device;

receiving an alert condition over the network from at least one device, wherein the alert condition includes information about a location;

determining an alert type based, at least in part, on information associated with the alert condition;

using information associated with the one or more characteristics to automatically modify an audio setting of the audio device when it is determined that the audio device is associated with the location, wherein the modification of the audio setting is based, at least in part, on the determined alert type; and in response to determining that the alert condition has ended, restoring the audio setting to a previous state.

14. The method of claim 13, further comprising changing the audio setting in response to detection of a spoken phrase.

15. The method of claim 13, further comprising restoring the audio setting to the previous state when a predetermined amount of time has passed since the alert condition was triggered.

16. The method of claim 13, further comprising restoring the audio setting to the previous state when an authorization is received.

17. The method of claim 13, wherein the alert condition is triggered from a third party system.

18. The method of claim 13, wherein the information about the location includes information about a particular business.

19. The method of claim 13, wherein the audio device identification information includes current location information of the audio device.

20. The system of claim 1, wherein the audio device information includes current location information of the audio device.

* * * * *